United States Patent [19]

Rasor

[11] Patent Number: 5,714,943
[45] Date of Patent: Feb. 3, 1998

[54] RADIO DATA INTERFACE DEVICE

[75] Inventor: Gregg Edward Rasor, Boynton Beach, Fla.

[73] Assignee: Motorola, Inc., Schaumburg, Ill.

[21] Appl. No.: 355,451

[22] Filed: Dec. 13, 1994

Related U.S. Application Data

[63] Continuation of Ser. No. 915,208, Jul. 20, 1992, abandoned.
[51] Int. Cl.$^6$ ............................................. H04Q 1/00
[52] U.S. Cl. .................. 340/825.44; 379/57; 455/66
[58] Field of Search ................... 340/825.44; 379/57, 379/93; 455/66, 34.1

[56] References Cited

U.S. PATENT DOCUMENTS

| | | | |
|---|---|---|---|
| 4,490,579 | 12/1984 | Godoshian | 340/825.44 |
| 4,812,843 | 3/1989 | Champion | 379/96 |
| 5,043,718 | 8/1991 | Shimura | 340/825.44 |
| 5,046,066 | 9/1991 | Messenger | 455/66 |

OTHER PUBLICATIONS

The Penguin Dictionary of Electronics, 1988 pp. 470-471 and 537.
British Post Office communication Standard (POCSAG) Jul. 1979.

*Primary Examiner*—Brian Zimmerman
*Attorney, Agent, or Firm*—Gregg Rasor

[57] ABSTRACT

A radio data interface device (201) for facilitating communication of at least one selective call message with at least one messaging subscriber (202, 202', 202"). The radio data interface device comprises a microcontroller (208) including at least one electronic memory (209, 210, 211, 212) and a processor (213), at least one data port (214) coupled to the microcontroller (208) for communicating the at least one selective call message received by a selective call receiver (204) to the microcontroller (208), and a network interface (215) coupled to and controlled by the processor (208). The processor (208) is capable of executing a microcode program, a portion of which functions to maintain a dynamic registry of messaging subscribers in the at least one electronic memory (209, 210, 211, 212). The network interface (215) supports at least one data link transport protocol for communicating at least a portion of the least one selective call message between the radio data interface device (201) and the at least one messaging subscriber (202, 202', 202").

8 Claims, 4 Drawing Sheets

| Network User name | Network address | Pocsag address | Network sub-address | E-Mail address |
|---|---|---|---|---|
| Wright, John | 145.4.2.1 | 042092 | 0001F | wright@mot |
| Davis, William | 145.4.20.6 | 002258 | 000A2 | davis@mot |
| Craig, Robert | 31101, 225 | 012090 | 03FA1 | craig@mot |
| Tanner, Dave | 127.3.88.104 | 002263 | 00003 | tanner@mot |
| . | . | . | . | . |
| . | . | . | . | . |
| . | . | . | . | . |
| Rasor, Gregg | 16245, 27 | 000106 | 00A07 | rasor@mot |

*FIG. 3*

| 1 | 2-19 | 20/21 | 22-31 | 32 |
|---|---|---|---|---|
| 0 | ADDRESS / ID | FUNC BITS | ERROR CORRECTING CODE | PE |
| 1 | MESSAGE | | ERROR CORRECTING CODE | PE |

*FIG. 4*

RADIO DATA INTERFACE DEVICE

This is a continuation of application Ser. No. 915,208, filed Jul. 20, 1992 and now abandoned.

FIELD OF THE INVENTION

This invention relates in general to electronic mail systems and more particularly to an electronic mail system for communicating messages via a selective call receiver.

BACKGROUND OF THE INVENTION

Electronic mail systems typically employ a wired or wireless local area network (LAN) that communicates message data from a user (source) to at least one other user (destination). The local area network may include network communication devices that selectively route the message data in and out of the LAN to provide long-distance communication capability over a wide area network (WAN).

Several methods are available to implement a WAN. A first method utilizes a transparent "bridge" that allows uncensored, bi-directional data transfer between connected network segments. Network bridges are the simplest method for interconnecting multiple LAN's, but they do not implement security features that may be necessary to prevent unauthorized access of message data outside of the LAN by "hackers" (e.g., an overly curious system user that attempts to monitor communications not intended for that user). A second and better method of interconnecting multiple LAN's can be implemented using a router. Conventional routers allow control over the distribution of message data by supervising a virtual (peer to peer) connection between users and/or electronic mail centers. In order to connect to a distant destination through a router, the user's addresses (source and destination address) must be authorized in the router's access control list. Access to a remote destination is denied when a user attempts an unauthorized connection through a router. WAN messaging systems that use routers with access control lists yield a significant improvement in security over a bridge coupled WAN system. However, since conventional wired and/or wireless network topologies may implement bi-directional communications, and furthermore, since there must be an access code for administering the router's access control list, there is still an avenue to breach the security of private data messages transmitted over the WAN.

A solution to this security problem can be had using one way selective call communication technology. One way communication systems typically use a receiver (e.g., a selective call receiver or "pager") that has at least one unique call address associated therewith. These radios receive and decode an address, then typically alert a destination user to the presence of incoming information and operate to present this information. One way radio communication systems have proven to be an excellent vehicle for delivering voice, numeric, alphanumeric or coded information to the destination user. Contemporary one way radio communication systems offer a higher level of message security than conventional LAN based messaging systems because the access control list containing the actual addresses of service subscribers is not available to a user (e.g., subscriber) other than the system administrator. Since communication traffic in a selective call signaling system is only be decoded by the destination receiver, and the system's access control list is not accessible to the selective call receiver user as in the LAN/WAN environment, the probability of a message security breach is lowered significantly.

Consequently, what is needed is an apparatus that can act as a secure communication gateway to an information network. The apparatus may operate in conjunction with a local and/or wide area selective call messaging system that embraces the user-friendliness of computer based electronic mail or a conventional paging system. Furthermore, the apparatus should provide the capability to securely deliver and originate messages to a variety of electronic devices using conventional signal transport means such as wired or wireless data links.

SUMMARY OF THE INVENTION

Briefly, according to the invention, there is provided a radio data interface device for facilitating communication of at least one selective call message with at least one messaging subscriber. The radio data interface device comprises a microcontroller including at least one electronic memory and a processor, at least one data port coupled to the microcontroller for communicating the at least one selective call message received by a selective call receiver to the microcontroller, and a network interface coupled to and controlled by the processor. The processor is capable of executing a microcode program, a portion of which functions to maintain a dynamic registry of messaging subscribers in the at least one electronic memory. The network interface supports at least one data link transport protocol for communicating at least a portion of the least one selective call message between the at least the network control device and the at least one messaging subscriber.

BRIEF DESCRIPTION OF THE DRAWINGS

FIG. 3 illustrates a dynamic registration table used by the radio data interface device to effect messaging in accordance with the preferred embodiment of the present invention.

FIG. 4 illustrates exemplary POCSAG address and data message word formats that may be used to convey selective call messages in accordance with the preferred embodiment of the present invention.

DESCRIPTION OF A PREFERRED EMBODIMENT

Figure 1:
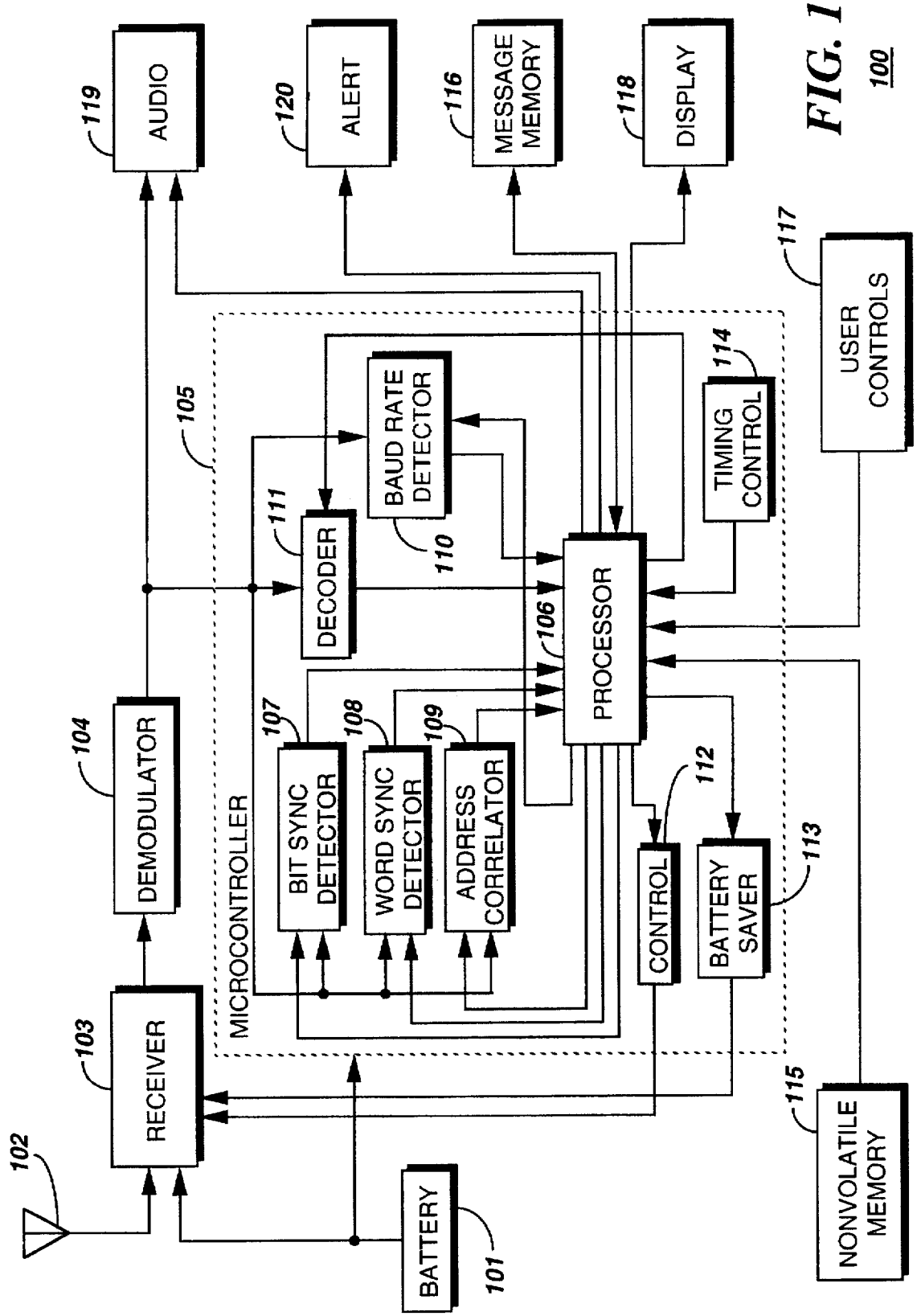
FIG. 1 is a block diagram of a selective call receiver in accordance with the present invention.

Referring to FIG. 1, a battery 101 powered selective call receiver 100 operates to receive an information signal via an antenna 102. A receiver 103 couples the received information signal to a conventional demodulator 104 that is capable of recovering analog or digital information. Received digital information is recovered as a serial bit stream that is then coupled to a microcontroller 105 for interpreting and decoding the serial bit stream as address, control, and data signals. In the preferred embodiment, the microcontroller 105 may comprise a processor 106, a bit synchronization detector 107, a word synchronization detector 108, an address correlator 109, a baud rate detector 110, a data decoder 111, a control circuit 112, a battery saver 113, and a timing control 114, implemented in hardware, software, or a combination thereof. Examples of commercially available microcontrollers suitable for implementing the preferred embodiment of the present invention are Motorola's MC68HC05xx or M68HC11xx. Complete descriptions of these devices are available in Motorola's data book set entitled "Microprocessor, Microcontroller, and Peripheral Data," volumes I and II, Series A, © 1988 by MOTOROLA, INC.

More specifically, in the microcontroller 105 the serial bit stream is coupled to the baud rate detector 110 that determines a receiving data rate associated with the recovered information. When the receiving data rate is determined, the bit synchronization detector 107 establishes synchronization between the microcontroller's 105 data decoding components (106, 109, and 111) and the individual signals (e.g., address, control, and data signals) in the recovered information. Once bit synchronization is established, the word synchronization detector 108 searches the serial bit stream for information indicating the beginning of a batch or frame. When the microcontroller 105 has established both bit and word synchronization, the recovered information may be searched for a group identification code associated with the selective call receiver. When a group identification code is found corresponding to the selective call receiver, it will search only those code frames associated with the receiver's group for pages intended for the selective call receiver. During the period between like frames, the microcontroller 105 will preferably "shut-down" the receiver 103 and demodulator 104, thereby conserving battery power. The interval between like frames is known in the art as a "sleep" period. If the system protocol is designed such that pages targeted for a specific group identifier, and pages intended for a particular selective call receiver are sent only during the transmission of that receiver's group, no pages are missed during the sleep period. A receiver that operates in the fashion discussed above is said to be operating in a "battery saving" mode.

In determining the selection of the particular selective call receiver, a correlation is performed between a predetermined address associated with the selective call receiver and a received address. To accomplish this, the address correlator 109, which comprises a signal processor, correlates a received address with the predetermined address or addresses stored in the selective call receiver's non-volatile memory 115 or code plug. Optionally, the non-volatile memory 115 may reside inside a support integrated circuit (not shown) or in the micro controller 105. The non-volatile memory 115 typically has a plurality of registers for storing a plurality of configuration words that characterize the operation of the selective call receiver. When a valid correlation of the received address with the predetermined address associated with the selective call receiver occurs (the addresses correlate), the microcontroller 105 may in a tone-only mode activate an alert 120. Alternatively, in response to a valid data address correlation, the decoder 111 operates to decode at least one selective call message from the received information signal and couples message information to the message memory 116.

In accordance with the recovered information, and settings associated with the user controls 117, the selective call receiver presents at least a portion of the message information, such as by a display 118 or an audio section 119, and signals the user via an audible, visual, or tactile alert 120 that a message has been received. The user may view information that is automatically presented on the display 118 or manually presented in response to activating the appropriate user controls 117.

The microcontroller 105 may also include items such as a conventional signal multiplexer, a voltage regulator and control mechanism, a current regulator and control mechanism, environmental sensing circuitry such as for light or temperature conditions, audio power amplifier circuitry, control interface circuitry, and display illumination circuitry. These elements are arranged in a known manner to provide an information receiver as requested by a customer.

Figure 2:
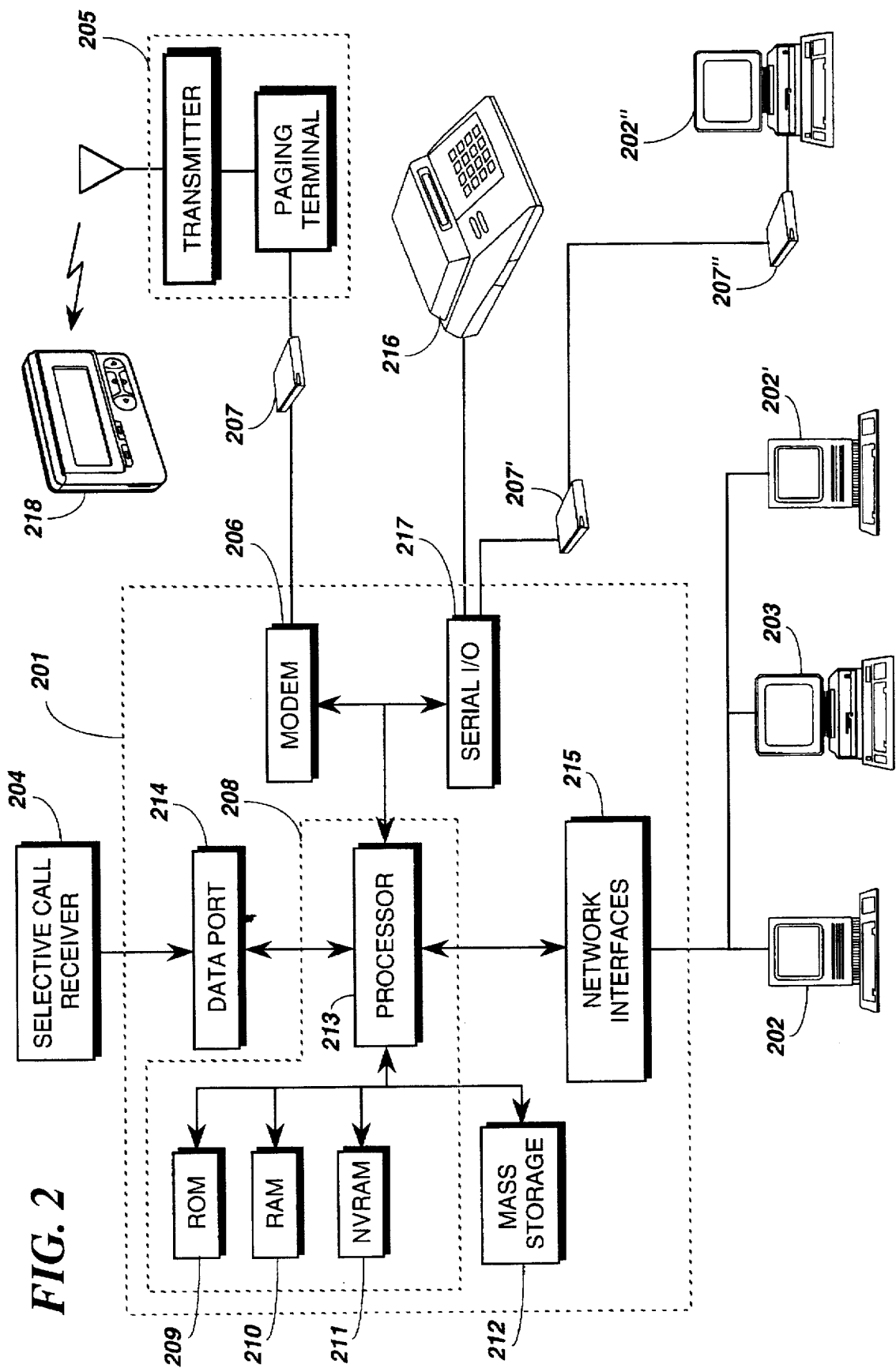
FIG. 2 illustrates a radio data interface device, at least one messaging subscriber unit, and a selective call receiver, all configured for operation in accordance with the preferred embodiment of the present invention.

Referring to FIG. 2, the illustration shows a radio data interface device 201, at least one messaging subscriber unit 202, 202', 202", an electronic mail server 203, and a selective call receiver 204, all configured for operation in accordance with the preferred embodiment of the present invention. FIG. 2 further illustrates a conventional Radio Common Carrier (RCC) paging system 205 coupled to the radio data interface device 201 via a PSTN (public switched telephone network) connection, preferably by using an integrated modem 206 and at least one conventional modem 207. The radio data interface device 201 facilitates communication of at least one selective call message with at least one messaging subscriber unit 202, 202', 202". In the preferred embodiment, a remote messaging subscriber unit 202" may be coupled to the radio data interface device 201 via a PSTN connection, preferably by using conventional modems 207', 207". The radio data interface device includes a microcontroller 208 comprising at least one electronic memory such as a ROM (read only memory) 209, a RAM (random access memory) 210, a NVRAM (nonvolatile memory, e.g., EEPROM or the like) 211, or possibly a mass storage device (e.g., a hard disk drive or the like) 212, and a processor 213. The processor is capable of executing a microcode program, a portion of which functions to maintain a dynamic registry (FIG. 3) of messaging subscribers in the at least one electronic memory. Coupled to the microcontroller 208 is at least one data port 214 for communicating the at least one selective call message received by the selective call receiver 204 to the microcontroller 208, and a network interface 215. The network interface 215 is capable of supporting at least one data link transport protocol such as X.25 packet, internet protocol (IP), address resolution protocol (ARP) or the like, for communicating at least a portion of the least one selective call message between the at least the radio data interface device 201 and the at least one messaging subscriber unit 202, 202', 202".

To implement messaging capability in a paging system, the address and message information are transmitted using a protocol such as POCSAG (a code from Great Britain's Post Office Code Standardisation Advisory Group) or GSC (Motorola's Golay Sequential Code). These protocol formats are designed to communicate messages to at least one selective call receiver and are well known to one of ordinary skill in the art of Paging systems. A typical selective call message may consist of an address signal if the message is a tone only message, or an address signal and a data packet if the message is a data message. Operationally, the radio data interface device 201 uses the selective call receiver 204 to receive at least one message. After receipt of the message, the radio data interface device 201 controls the distribution of received messages to the at least one messaging subscriber unit 202, 202', 202", a conventional paging system 205, or possibly a Motorola People Finder® 216 via a serial communications interface 217.

The system depicted in FIG. 2 realizes may advantages over prior art selective call messaging systems. The radio data interface device 201 can be commanded to automatically send received messages to an electronic mail server for later perusal by a messaging subscriber, or messages can be automatically forwarded to a messaging subscriber's personal selective call receiver 218. These capabilities are made possible by using a dynamic registration table (FIG. 3) that comprises a messaging subscriber's E-Mail address and an address of a messaging subscriber's personal selective call receiver 218.

Another advantage of the radio data interface device 201 over prior art selective call messaging systems is that the radio data interface device 201 can also act to deliver a message from an originator (the at least one messaging subscriber unit 202, 202', 202") to at least one client such as the conventional paging system 205, the Motorola People Finder® 216, the messaging subscriber units 202, 202', 202", or possibly a personal computer having paging capability (not shown). This allows each registered user to transparently originate selective call messages from their subscriber unit using either a custom software application (specific to selective call messaging) or a conventional electronic mail system such as SMTP (simple mail transport protocol) or X.400.

Referring to FIG. 3, the illustration shows a dynamic registration table 300 used by the radio data interface device to effect messaging in accordance with the preferred embodiment of the present invention. The radio data interface device maintains a dynamic registry of servers (originators) and clients (targets). The registry comprises the table 300 having a reference designator 301 (network user name) with a corresponding network sub-address 302, a personal paging address 303 (e.g., a POCSAG or Motorola Golay Sequential Code selective call address), a network address 304 (e.g., a TCP/IP or AppleTalk®, a registered trademark of Apple Computer, address), and an electronic mail address 305 (e.g., SMTP, simple mail transport protocol, ANSI X.400, or others).

Referring back to FIGS. 1 and 2, in a receive mode, a receiver 103 receives an information signal that is coupled to a detector (demodulator) 104 for recovering a serial bit stream from the received information signal. The serial bit stream comprises at least an address signal that is coupled to an address correlator 109 responsive to the address signal, the address correlator operating to correlate a received address with a predetermined address associated with selecting the selective call receiver. Upon valid correlation of the received address with the predetermined address associated with selecting the selective call receiver, a decoder 111 operates to decode the at least one selective call message from the received information signal. A processor 106 coupled to the decoder 111, address correlator 109, detector 104, receiver 103, and radio data interface device 201; functions to communicate the at least one selective call message decoded from the received information signal to the radio data interface 201 device via the at least one data port 205.

When the radio data interface device 201 receives the at least one selective call message, the received data message is further decoded in a conventional manner to parse each sub-address and its associated data (message) from the at least one selective call message. Upon completion of the parsing, the radio data interface device 201 establishes a connection with each subscriber unit 202 addressed or possibly with an electronic mail server 203, and distributes the received data (messages) to the designated subscriber unit(s) or mail server(s).

In the origination or sending mode, if a user registered with the radio data interface device 201 wishes to send an information message to a selective call receiver or another subscriber unit, the user's local E-Mail (electronic mail) software encapsulates the information in a conventional manner, establishes a connection with the radio data interface device 201, transfers the information along with the target(s) (destination) name and/or identification to the radio data interface device 201. The radio data interface device 201 then originates an information transmission either via the Motorola People Finder® 216 (portable or full size paging system terminal, preferably serially connected to the radio data interface device 201) or using a Radio Common Carrier 205 (e.g., a paging subscriber service provider) via modem access. Conditioning of the information to be transmitted can be performed either by the radio data interface device 201 or by a conventional paging system encoder such as those incorporated in a Radio Common Carrier's 205 paging terminal or in a Motorola People Finder® 216.

As can be appreciated by one or ordinary skill in the art, this invention can be realized in a number of embodiments of which the disclosed embodiment is only one of many equivalent alternatives.

Referring to FIG. 4, the illustration shows exemplary POCSAG address and data message word formats that may be used to convey selective call messages in accordance with the preferred embodiment of the present invention. The POCSAG message depicted comprises two 32-bit code words, the first code word 201 being a POCSAG address code word as denoted by a first bit equal to zero. The POCSAG address code word 201 illustrated includes an address ID in bits 2–19, function bits in bits 20 and 21, error correcting code in bits 22–31, and an end-of-code word flag in bit 32. In a POCSAG data message, the address code word 201 is followed by a POCSAG message code word 202 as denoted by a 1 in the first bit position of the 32-bit code word. The POCSAG message code word 202 further comprises 20 bits of data in bits 2–21 representing a message, an error correcting code in bits 22–31, and a code word end bit at bit 32. Using this format, both numeric and alphanumeric messages can be reliably transmitted to a selective call receiver.

Figure 5:
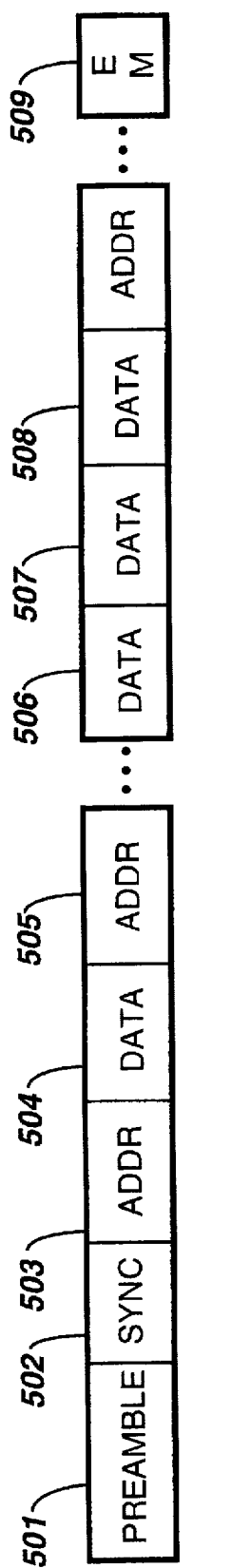
FIG. 5 illustrates an exemplary POCSAG paging protocol transmission that may be used to convey selective call messages in accordance with the preferred embodiment of the present invention.

Referring to FIG. 5, the illustration shows an exemplary POCSAG paging protocol transmission that may be used to convey selective call messages in accordance with the preferred embodiment of the present invention. The transmission comprises a preamble word 501 preferably having 576 bits of alternating 1's and 0's that allow a selective call receiver to establish bit synchronization with the protocol data stream. Following the preamble word 501 is a conventional POCSAG synchronization codeword 502 denoting that start of a POCSAG batch transmission. Each POCSAG batch comprises 8 frames numbered 0 through 7, each frame containing 2 codewords. The population of selective call receivers are divided up into eight groups numbered 0 through 7. Each selective call receiver is allocated to one of the eight frames according to the three least significant bits of its twenty-one bit address codeword 503, 505 (e.g., 000=frame 0, 111=frame 7) and will only examine codewords in that frame. Message codewords 504, 506, 507, 508 for any receiver may be transmitted in any frame but will follow, directly, the associated address codeword(s) 503, 505. A complete message may embrace any number of codewords transmitted consecutively and may embrace one or more batches, but the synchronization codeword 502 must not be displaced by the message codewords 504, 506, 507, 508. Message termination is indicated by transmission of an address codeword 503, 505 following a message codeword 504, 506, 507, 508 or by transmitting a POCSAG idle codeword 509.

As can be appreciated by one of ordinary skill in the art, the preferred embodiment of the instant invention can be realized using any selective call signaling protocol capable of delivering data messages, not only the POCSAG protocol used in this example. This flexibility allows for unlimited future expansion into alternative high speed, high efficiency signaling protocols.

Figure 6:
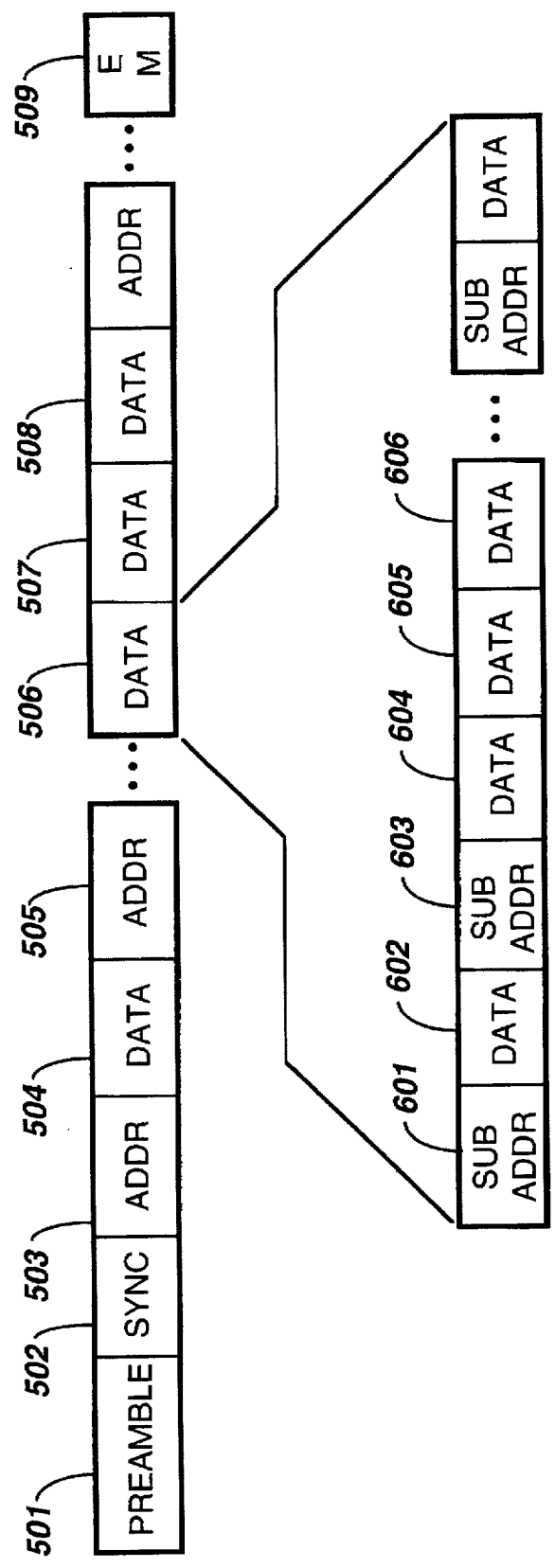
FIG. 6 illustrates typical selective call sub-messaging using the POCSAG paging protocol transmission of FIG. 5 in accordance with the preferred embodiment of the present invention.

Referring to FIG. 6, the illustration shows typical selective call sub-messaging using the POCSAG paging protocol transmission of FIG. 5 in accordance with the preferred embodiment of the present invention. The protocol in FIG. 5 is adapted for sub-messaging by including an encoded data block within the standard message codeword space allocated by a typical paging protocol such as POCSAG. This allows the operation of this system in any selective call signaling system that supports data messaging. A typical data block comprises at least one network sub-address 601, 603 and a corresponding data message having at least one data block 602, 604, 605, 606, the at least one network sub-address 601, 603 allowing selection of the at least one messaging subscriber and upon selection, delivery of the corresponding data message thereto. In this example, a first data message comprises data block 602 which corresponds with network sub-address 601, and a second data message comprises data blocks 604, 605, 606 which correspond with network sub-address 603. As in the POCSAG example discussed before, message termination is indicated by transmission of an sub-address 601, 603, following a data block 602, 604, 605, 606 or by transmitting an idle sub-address such as one containing all zeros. The radio data interface device 201 receives the raw message codewords 506, 507, 508 from the selective call receiver 204 and extracts any network sub-addresses and data blocks present. When a selected messaging subscriber unit's 202, 202', 202" address is extracted by the radio data interface device 201, a conventional network transferable message (e.g., electronic mail or peer to peer message) may be generated, its contents comprising the data message corresponding to the at least one network sub-address selected. This data message may include textural, graphical, audio, or possibly even multi-media data types. After generating the conventional network transferable message, it is sent to the selected messaging subscriber unit.

A distinct advantage of the messaging implementation previously discussed is that since conventional selective call signaling protocols like POCSAG already include error correction and detection, the application of these techniques to the sub-address 601, 603, and data block 602, 604, 605, 606 constituents is optional. This saves processing time at both the radio data interface device and in the messaging subscriber units.

Alternatively, the preceding messaging example could just as easily been implemented using an interleaved address and data scheme.

What is claimed is:

1. A radio data interface device for facilitating communication of at least one selective call message with at least one messaging subscriber, the radio data interface device comprising:

a microcontroller including at least one electronic memory and a processor;

at least one data port coupled to the microcontroller for communicating the at least one selective call message sent from one of a messaging subscriber unit and a messaging subscriber to a selective call receiver coupled to the processor that decodes the at least one selective call message to recover a sub-address and data associated therewith, the message comprising:

an address corresponding with a selected one of a plurality of clients and servers, the address comprising at least one of a network address, a personal paging address, and an electronic mail address, each of the network address, the personal paging address, and the electronic mail address corresponding with a reference designator in a dynamic registration table maintained in the at least one electronic memory, the reference designator allowing selection of at least one of the network address, the personal paging address, and the electronic mail address in response to a match between the reference designator and the sub-address, and the data associated with the at least one sub-address; and a network interface coupled to and controlled by the processor, the network interface supporting at least one data link transport protocol for communicating the message to the at least one messaging subscriber at the target indicated by the address.

2. The radio data interface device according to claim 1 further comprising a modem coupled to the microcontroller, the modem operating to facilitate communication with the selected one of the plurality of clients and servers comprising a selective call messaging service for originating an outbound selective call message from the at least one messaging subscriber.

3. The radio data interface device according to claim 1 wherein the electronic memory comprises a semiconductor memory coupled to the microcontroller for storing and retrieving data associated with the dynamic registration table of messaging subscribers and the outbound selective call message.

4. The radio data interface device according to claim 1 wherein the electronic memory comprises a disk based mass storage device coupled to the microcontroller for storing and retrieving data associated with the dynamic registration table of messaging subscribers and the outbound selective call message.

5. The radio data interface device according to claim 1 wherein the selective call receiver comprises:

a receiver for receiving and demodulating an information signal to provide a received information signal;

a detector for recovering a serial bit stream from the received information signal, the serial bit stream comprising at least an address signal, an address correlator responsive to the address signal, the address correlator operating to correlate a received address with a predetermined address associated with selecting the selective call receiver;

a decoder responsive to a valid correlation of the received address with the predetermined address associated with selecting the selective call receiver, the decoder operating to decode the at least one selective call message from the received information signal;

a processor coupled to the decoder, address correlator, detector, receiver, and radio data interface device; the processor functioning to communicate the at least one selective call message decoded from the received information signal to the radio data interface device via the at least one data port.

6. The radio data interface device according to claim 1 wherein the dynamic registration table comprises:

a network user name having a corresponding network address.

7. The radio data interface device according to claim 1 wherein the dynamic registration table of messaging subscribers further comprises:

a network user name having a corresponding electronic mail address.

8. The radio data interface device according to claim 1 wherein the dynamic registration table of messaging subscribers further comprises:

a network user name having a corresponding personal paging address.

* * * * *